(12) United States Patent
Murray

(10) Patent No.: US 10,399,491 B2
(45) Date of Patent: Sep. 3, 2019

(54) WARNING DEVICE FOR ROADSIDE STOPS

(71) Applicant: Simon John Murray, Crawley (GB)

(72) Inventor: Simon John Murray, Crawley (GB)

(*) Notice: Subject to any disclaimer, the term of this patent is extended or adjusted under 35 U.S.C. 154(b) by 0 days.

(21) Appl. No.: 14/874,975

(22) Filed: Oct. 5, 2015

(65) Prior Publication Data
US 2017/0096100 A1    Apr. 6, 2017

(51) Int. Cl.
*B60Q 7/00* (2006.01)

(52) U.S. Cl.
CPC .................... *B60Q 7/005* (2013.01)

(58) Field of Classification Search
CPC ... B60Q 1/00; B60Q 1/26; B60Q 1/52; B60Q 7/00; B60Q 7/005; B60Q 7/02; Y10S 40/903; Y10S 248/911; E01F 9/617; E01F 9/688; E01F 9/692; G09F 9/00; G09F 13/16
See application file for complete search history.

(56) References Cited

U.S. PATENT DOCUMENTS

| | | | | |
|---|---|---|---|---|
| 3,975,849 A * | 8/1976 | Tuleja | .................... | B60Q 7/005 116/63 T |
| 4,952,910 A * | 8/1990 | Straten | .................... | B60Q 7/00 116/63 T |
| 5,195,264 A * | 3/1993 | Johanson | .................... | B60Q 1/50 248/911 |
| 5,349,346 A * | 9/1994 | Wu | .................... | B60Q 7/00 116/63 T |
| 5,419,065 A * | 5/1995 | Lin | .................... | B60Q 7/00 40/550 |
| 2009/0084306 A1* | 4/2009 | Noonan, II | ......... | G09F 15/0062 116/63 T |

* cited by examiner

*Primary Examiner* — Ryan W Sherwin
(74) *Attorney, Agent, or Firm* — Wayne Edward Ramage; Baker Donelson

(57) ABSTRACT

A warning device or apparatus for use during roadside stops, with means to display one or more warning messages on the front of the warning device or apparatus at a height to be easily and quickly seen by oncoming drivers. The warning device may be a warning triangle, although other shapes may be used as appropriate according to the customs or laws for particular regions or areas. One or more message plates can be mounted on the warning device, with various messages selected according to the circumstances. An electronic message board may be similarly mounted.

8 Claims, 5 Drawing Sheets

- TIRE CHANGE
- TIRE
- FLOODING
- GAS
- HELP
- SLOW
- WET
- MEN AT WORK
- TREE

FIG. 3

WARNING DEVICE FOR ROADSIDE STOPS

FIELD OF INVENTION

This invention relates to an improved apparatus and device to be placed as a warning device behind a vehicle stopped on a roadside. More particularly, this invention relates to an improved warning device with warning messages displayed in a manner to be easily and quickly seen by oncoming drivers.

BACKGROUND OF THE INVENTION

The incidence of roadside fatalities is high. Numerous deaths are causes by vehicles running into stopped vehicles on a roadside, or striking individuals that may be working on a stopped vehicle. It is estimated that over 100 people each week in the United States are killed or injured while attending to a broken down vehicle due to being struck by another vehicle.

Vehicle drivers and operators may carry one or more warning devices in the vehicles for use during roadside stops (such as in the event of a breakdown). The device or devices are usually set up some distance to either side of the vehicle to warn oncoming drivers of the hazard presented by the stopped vehicle. The device thus promotes safety both for the stopped vehicle and the oncoming vehicles.

A common form of the device is a warning triangle, as disclosed in an earlier patent of the present inventor, Murray, GB 2,371,322 A, which is incorporated herein in its entirety for all purposes. Murray describes a warning triangle with a set of substrates carrying warning messages which are selectively displayed on a box-like base. The warning triangle is folded or disassembled for storing in the box-like base. However, the substrates in Murray can be difficult for oncoming drivers to see, read and comprehend, especially when travelling at speed, due to their position on the apparatus. In addition, the substrates can be difficult or awkward to change.

Accordingly, what is needed is an improved warning apparatus that addresses the above issues.

SUMMARY OF INVENTION

In various exemplary embodiments, the present invention comprises a warning device or apparatus for use during roadside stops, with means to display one or more warning messages on the front of the warning device or apparatus at a height to be easily and quickly seen by oncoming drivers. The warning device may comprise a warning triangle, although other shapes may be used as appropriate according to the customs or laws for particular regions or areas. The warning triangle can be held in an upright position by a variety of means, such as a support rod or beam extending from the back, or a base to which the warning triangle is attached. In one embodiment, the base comprises a cross with two arms intersecting at an angle. This arrangement holds the warning triangle in a secure upright position without use of a support rod or beam, with the arm extending to the front and back of the triangle preventing the triangle from tipping in either direction.

Support means are provided on the front of the warning triangle itself at a height above the base. Support means receives and provides secure support for a message plate selected from a set of message plates. Raising the message plate near the top of the triangle, or in the upper half of the triangle, makes it more visible to an oncoming driver, and its position on the face of the triangle draws the oncoming driver's attention immediately to the message as part of the warning. It also allows the driver's focus to stay at a higher level and not be drawn downward, thereby further enhancing safety.

In one embodiment, support means comprises a pair of clips or holders fastened to the triangle at their lower ends, one on each side of the triangle. The top end is open, and the message plate slide down into the clips or holders. The top end of the clips can be biased against the triangle, so as to hold the message plate more securely in place through friction. The clips may be angled so as to parallel the triangle element to which each is attached, or may be positioned at some other angle (e.g., straight vertically). In one embodiment, the clips or holders are removably attached or fastened to the triangle (e.g., through snaps, rods, or tab inserts into a corresponding slot in the triangle), so that the clips or holders can removed, thereby allowing use of the triangle alone. In another embodiment, the clips or holders are permanently fastened. The clips or holders may be made of any suitable material, including, but not limited to, plastic, metal, wood, or wire, and be solid, translucent, transparent, or open (e.g., wire frame).

In yet another embodiment, additional sets of clips or holders may be positioned above or below the first set, thereby allowing two or more message plates to be used simultaneously. In yet a further embodiment, the top end of the clips also are fastened to the triangle. Message plates would then be inserted sideways through the clip or holder. Other means of attachment also may be used, such as hooks (inserted through holes in the plates, the triangle, or both), springs, hook-and-loop fasteners, or the like.

Messages can be in any language and in any font, of any length (although short, concise messages are better). Messages also can be non-text, such as symbols or pictures or color. Messages can appear on one side of the message plate, or both. The message plates can be made of any suitable material, including plastic, metal, wood, or combinations thereof. In one embodiment, the message text is black against a white or very light background, for greatest contrast. In another embodiment, the text itself is brightly colored or reflective, to promote visibility, especially at night. In yet another embodiment, the message text may be lit (such as through LEDs or the like).

In yet a further embodiment, the message plate comprises a programmable electronic message board, where the user can select one or more pre-programmed messages to be shown on the message board display. The user also may be able to customize messages, or type in a message suitable for the situation. In this embodiment, the message board comprises a separate power source (such as batteries), an on/off switch, a display screen on the front of the message board, and a programmable user interface with a central processing unit for interacting with and controlling the message board. In yet a further embodiment, the message board has wireless communications capacity, allowing a user to program or control the message board through a smart phone, tablet computer, or other computing device.

BRIEF DESCRIPTION OF THE DRAWINGS

FIG. 3 shows views of various message plates.

DETAILED DESCRIPTION OF EXEMPLARY EMBODIMENTS

In various exemplary embodiments, the present invention comprises a warning device or apparatus for use during roadside stops, with means to display one or more warning messages on the front of the warning device or apparatus at a height to be easily and quickly seen by oncoming drivers. The present invention thus draws the attention of oncoming drivers to the presence of the stopped vehicle and the dangerous circumstances, thereby increasing safety and reducing fatalities.

Figure 1:
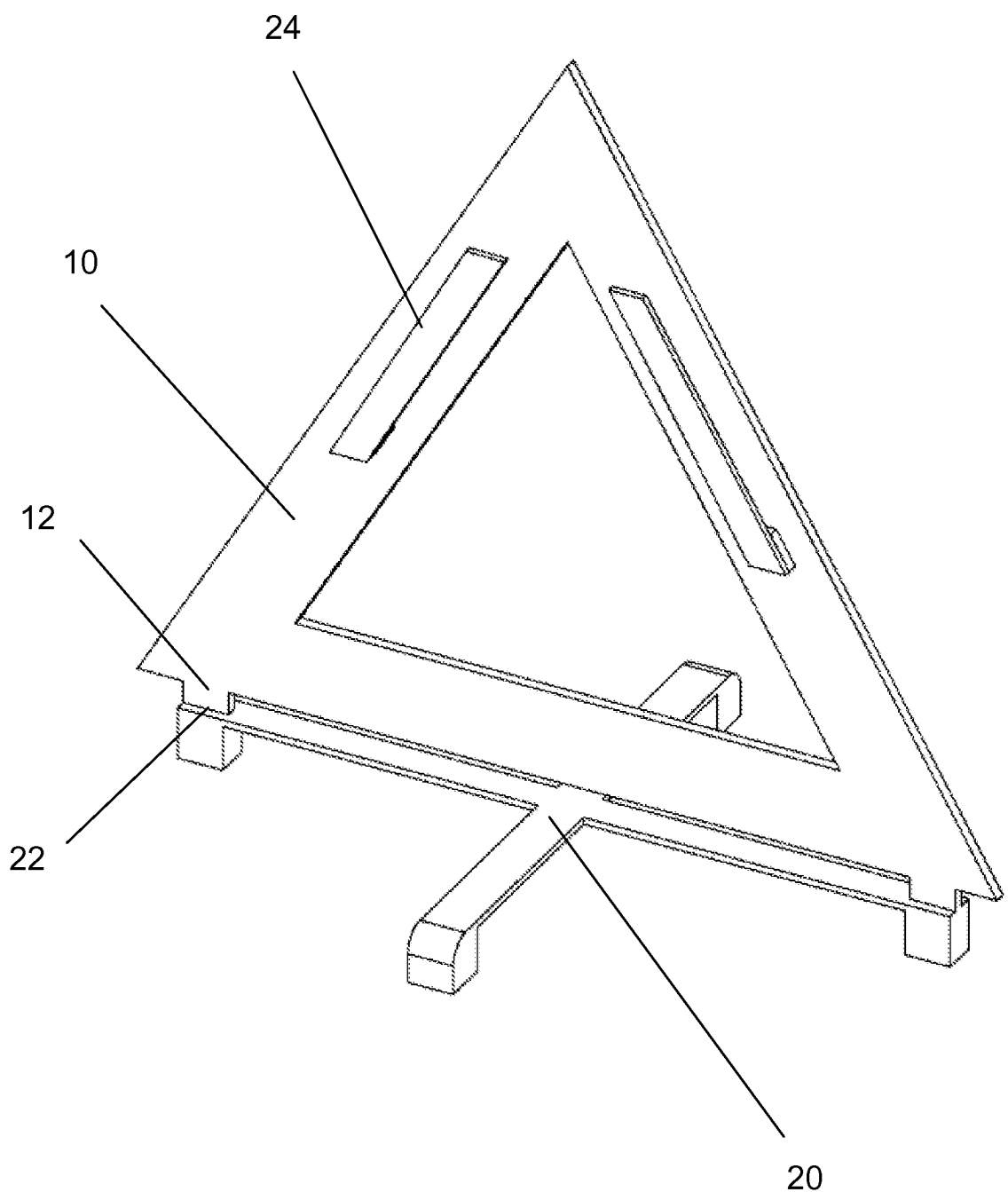
FIG. 1 shows a view of a warning triangle in accordance with an embodiment of the present invention.
Figure 2:
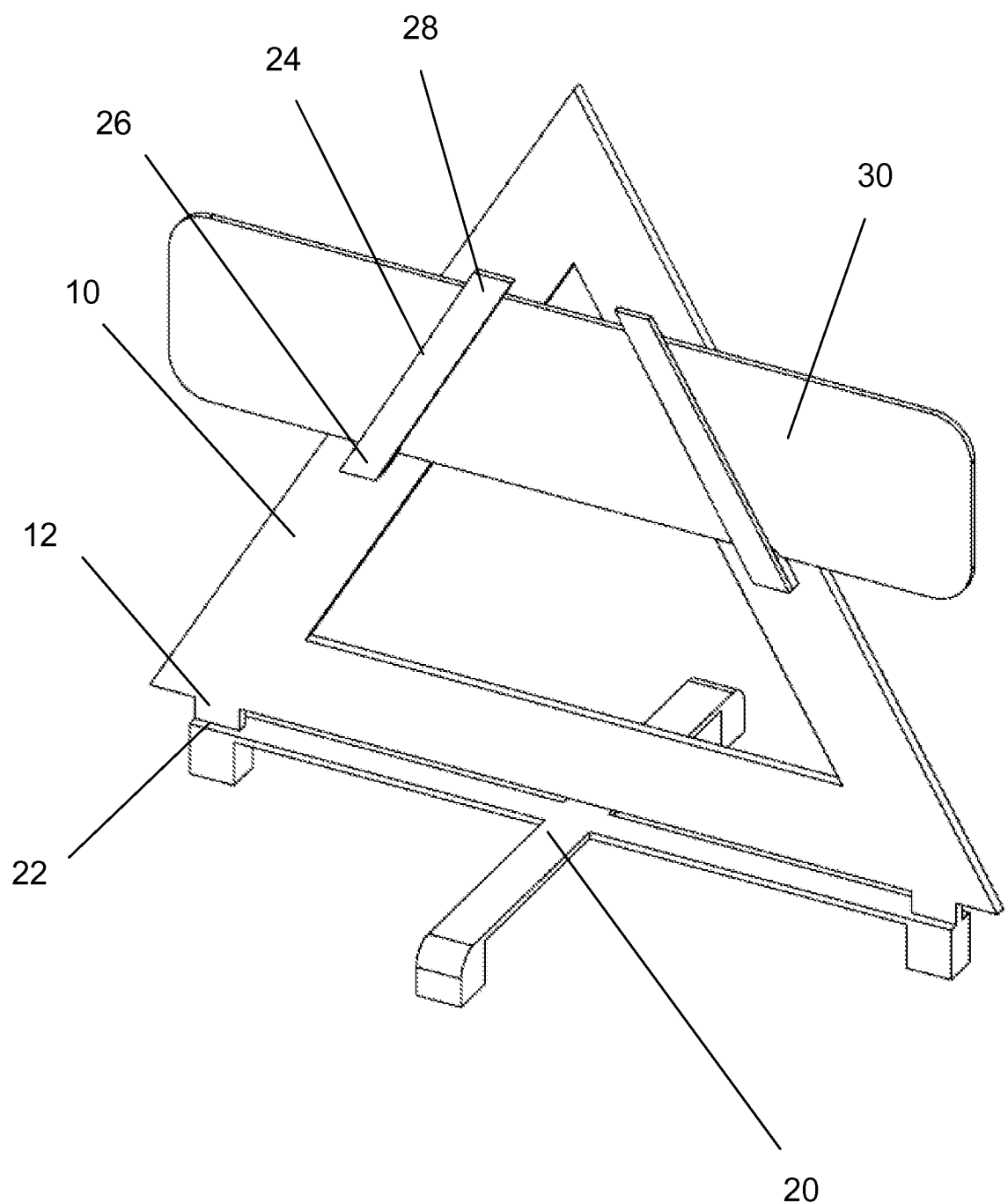
FIG. 2 shows a view of the warning triangle of FIG. 1 with a message plate held in place using clips.

In the embodiment shown in FIGS. 1-2, the warning device comprises a warning triangle 10, although other shapes may be used as appropriate according to the customs or laws for particular regions or areas. The warning triangle may be made of any suitable material, including, but not limited to, plastic, wood, metal, or combinations thereof, and should be an appropriate color (e.g., orange) and reflective, in accordance with customs or laws for particular regions or areas. In some exemplary embodiments, the warning device may comprise a cone, barrel, stand, rack, or other object that be readily moved and positioned as needed.

The warning triangle can be held in an upright position by a variety of means, such as a support rod or beam extending from the back, or a base to which the warning triangle is attached. As seen in FIG. 1, in one embodiment the base 20 comprises a cross with two arms intersecting at an angle (in the embodiment shown, at a substantially 90-degree angle). The bottom of the warning triangle comprises two tabs 12 that fit into corresponding slots 22 in the base. This arrangement holds the warning triangle in a secure upright position without use of a support rod or beam, with the arm extending to the front and back of the triangle preventing the triangle from tipping in either direction. This avoids the problem of the triangle being blown or falling forward (which a support rod can do nothing to prevent), or having the support rod being blown or knocked away.

Support means are provided on the front or back of the warning triangle itself at a height above the base. Support means receives and provides secure support for a message plate (which may be selected from among a plurality or set of such plates) 30. Raising the message plate near or above the top of the triangle, or in the upper half of the triangle, makes it more visible to an oncoming driver, and its height and position on the triangle draws the oncoming driver's attention immediately to the message as part of the warning. It also allows the driver's focus to stay at a higher level and not be drawn downward, thereby further enhancing safety.

As seen in FIGS. 1 and 2, in one embodiment support means comprises a pair of clips or holders 24 fastened to the triangle at their lower ends 26, one on each side of the triangle. The top end 28 is open, and the message plate slides down into the clips or holders. The top end of the clips can be biased against the triangle, so as to hold the message plate more securely in place through friction. The clips may be angled so as to parallel the triangle element to which each is attached, or may be positioned at some other angle (e.g., straight vertically with respect to the bottom of the triangle). In one embodiment, the clips or holders are removably attached or fastened to the triangle (e.g., through snaps, rods, or tab inserts into a corresponding slot in the triangle), so that the clips or holders can be removed, thereby allowing use of the triangle alone. In another embodiment, the clips or holders are permanently fastened. The clips or holders may be made of any suitable material, including, but not limited to, plastic, metal, wood, or wire, and be solid, translucent, transparent, or open (e.g., wire frame). The clips or holders may extend for the width (or more) of the message plate, or only part of the width of the message plate.

In yet another embodiment, additional sets of clips or holders may be positioned above or below the first set, thereby allowing two or more message plates to be used simultaneously.

Figure 4A:
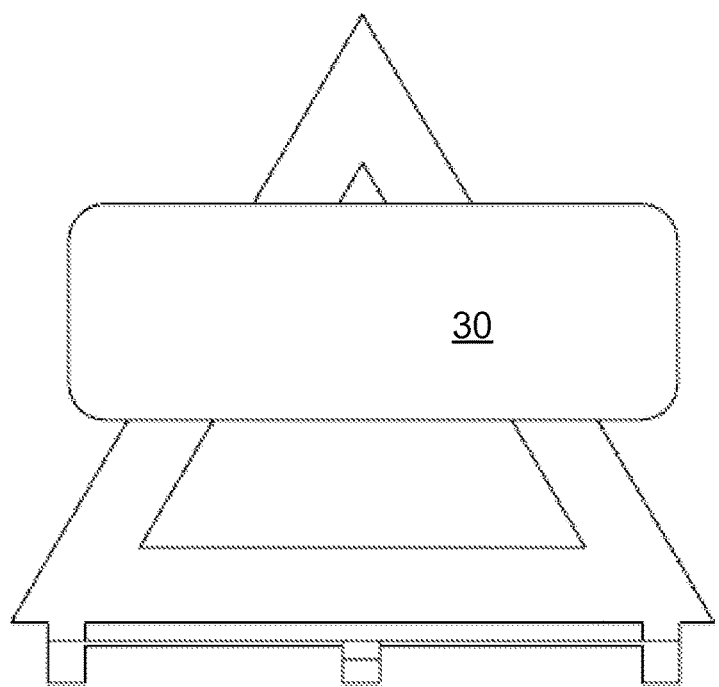
FIGS. 4A-B show views of a warning triangle using hook-and-loop fasteners for the message plate.
Figure 4B:
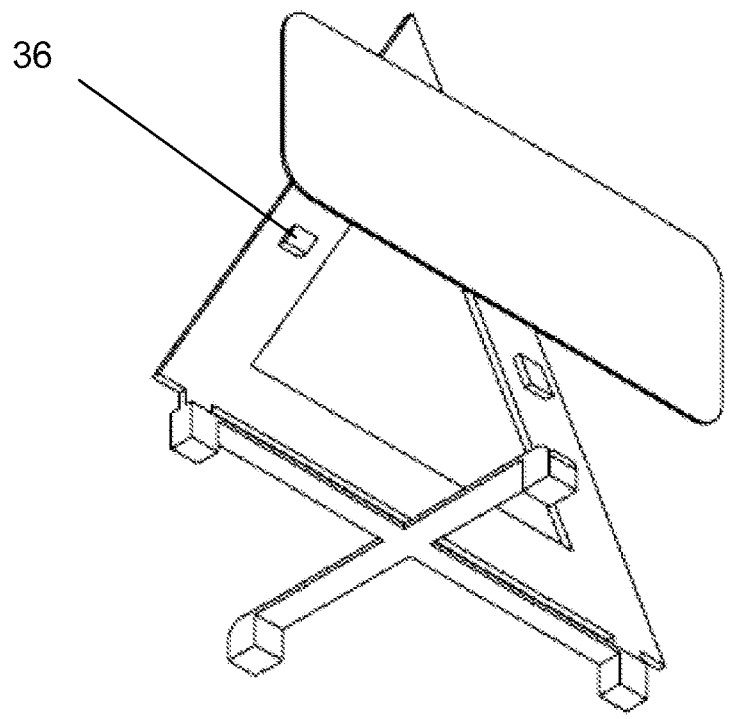

In yet a further embodiment, the top end of the clips also are fastened to the triangle. Message plates would then be inserted sideways through the clip or holder. Other means of attachment also may be used, such as hooks (inserted through holes in the plates, the triangle, or both), springs, hook-and-loop fasteners 36 on the face of the triangle and the back of the message plate (as seen in FIGS. 4A and 4B), or the like.

Examples of messages on the message plates 30 are seen in FIG. 3. Messages can be in any language and in any font, of any length (although short, concise messages are better). Messages also can be non-text, such as symbols or pictures or color. Messages can appear on one side of the message plate, or both. The message plates can be made of any suitable material, including plastic, metal, wood, or combinations thereof.

In one embodiment, the message text is black against a white or very light background, for greatest contrast. In another embodiment, the text itself is brightly colored or reflective, to promote visibility, especially at night. In yet another embodiment, the message text may be lit (such as through LEDs or the like).

Figure 5:
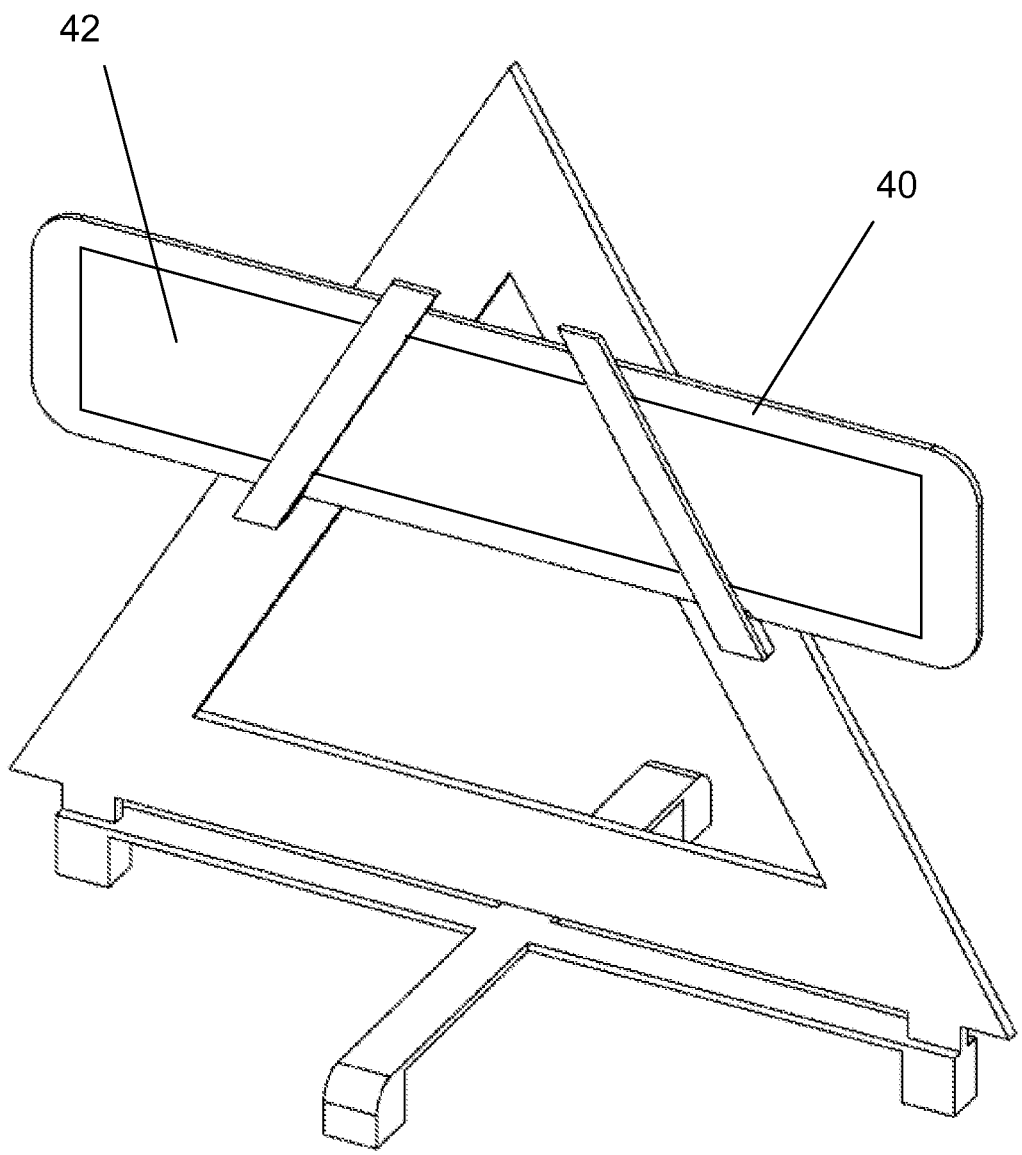
FIG. 5 shows a view of the warning triangle of FIG. 1 with an electronic message plate or board.

In yet a further embodiment, the message plate comprises a programmable electronic message plate or board 40, as seen in FIG. 5, where the user can select one or more pre-programmed messages to be shown on the message board display. The user also may be able to customize messages, or type in a message suitable for the situation. In this embodiment, the message board comprises a separate power source (such as batteries), an on/off switch, a display screen 42 on the front of the message board, and a programmable user interface with a central processing unit for interacting with and controlling the message board. In yet a further embodiment, the message board has wireless communications capacity, allowing a user to program or control the message board through a smart phone, tablet computer, or other computing device.

While the above invention has been described in the context of roadside use for a stopped or broken down vehicle, it can also be used in other situations to provide a warning. For example, it may be used to indicate the presence of workers or workcrews, such as construction or roadway workers, or a tree-cutting truck and crew, with appropriate messages (e.g., "MEN AT WORK", "TREE CUTTING"). It also may be used to indicate hazards (e.g., "FLOODING", "TREE DOWN", "LINE DOWN"). Further, it may be used in non-traffic situations, such as to indicate the presence of hazards in another outdoor or indoor space (e.g., "WET FLOOR").

In a further embodiment, the message plates may be used separately from the warning triangle or cone, particularly in situations where the warning triangle or cone cannot be safely or securely positioned.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A warning apparatus, comprising:
   a triangle with a front and a back, a right arm, a left arm, and a bottom arm forming an outer perimeter, wherein the right arm and left arm meet at an apex of the triangle;
   a pair of holders attached to the front face of the triangle, one of said pair of holders attached to the right arm and the other of said pair of holders attached to the left arm, each of said pair of holders with an open upper end and a closed lower end, wherein each holder is attached to its respective arm at its closed lower end and extends upward parallel with its respective arm towards the apex; and
   one or more message plates with a right end and a left end, and a front face with message indicia thereon, wherein said one or more message plates are adapted to be removably held on said triangle by said pair of holders;
   wherein said message plate, when held on said triangle by said pair of holders, extends across the front of the triangle above a midpoint of the right and left arms but not above the apex of the triangle, and the right end and left end extend beyond the triangle outer perimeter.

2. The apparatus of claim 1, wherein said triangle is mounted on a base.

3. The apparatus of claim 2, wherein the base comprises a cross, with a rightward extending arm and a leftward extending arm on which the bottom arm of the triangle is positioned, and a forward extending arm and backward extending arm with no part of the triangle positioned thereon.

4. The apparatus of claim 1, wherein the message indicia comprises text.

5. The apparatus of claim 1, wherein the message indicia comprises symbols.

6. The apparatus of claim 1, wherein the message indicia comprises reflective material.

7. The apparatus of claim 1, wherein the message indicia is lit.

8. The apparatus of claim 1, wherein the one or more message plates comprise an electronic message board with a display.

* * * * *